No. 850,060. PATENTED APR. 9, 1907.
A. K. SCHULTE.
COOKER.
APPLICATION FILED MAY 12, 1906.
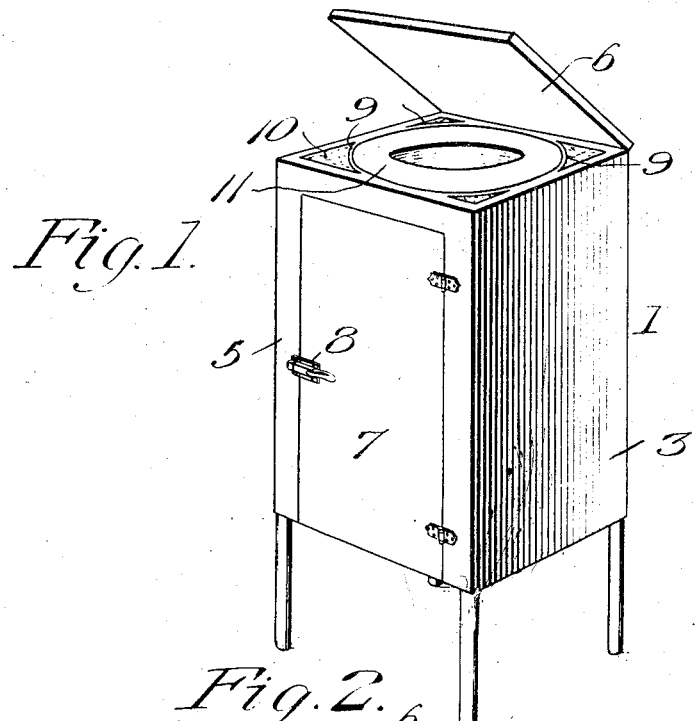
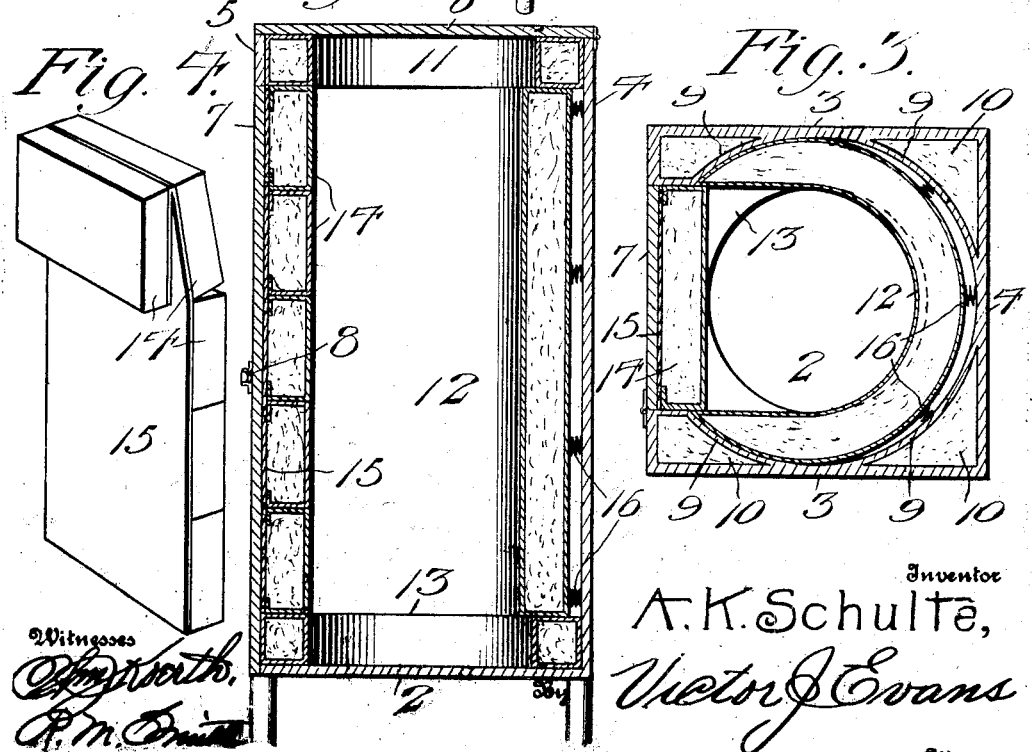
Inventor
A. K. Schulte,
Victor J. Evans

UNITED STATES PATENT OFFICE.

AUGUST K. SCHULTE, OF PHILADELPHIA, PENNSYLVANIA.

COOKER.

No. 850,060.   Specification of Letters Patent.   Patented April 9, 1907.

Application filed May 12, 1906. Serial No. 316,579.

*To all whom it may concern:*

Be it known that I, AUGUST K. SCHULTE, a citizen of the United States, residing at Philadelphia, in the county of Philadelphia and State of Pennsylvania, have invented new and useful Improvements in Cookers, of which the following is a specification.

This invention relates to cookers, the object of the invention being to provide a simple, practical, and effective secondary cooker or oven by means of which the cooking operation may be continued after the material being cooked has been removed from an ordinary cooking-stove or from over a fire.

It is well understood that after any material being cooked has been raised to a high temperature by allowing the same to remain on fire for a period of from five to thirty minutes the cooking continues after such material is removed from the fire. If the said material can be inclosed in an air-tight compartment thoroughly insulated from the outside atmosphere, the cooking operation will be continued for a very considerable period of time—say for several hours—and by such continued and comparatively slow cooking operation the material will be thoroughly cooked and rendered palatable, savory, and digestible.

The object of the present invention is to provide a cooker of such construction as to render the same convenient and accessible for inserting and removing the dishes containing the material to be cooked, and whereby the dishes are securely held in place, and whereby also the cooker as a whole may be thoroughly ventilated and cleansed as frequently as necessary.

With the above and other objects in view, the nature of which will more fully appear as the description proceeds, the invention consists in the novel construction, combination, and arrangement of parts hereinafter more fully described, illustrated, and claimed.

In the accompanying drawings, Figure 1 is a perspective view of a cooker constructed in accordance with the present invention. Fig. 2 is a vertical section through the same. Fig. 3 is a horizontal section thereof. Fig. 4 is an enlarged detail perspective view of the folding or sectional door pad or cushion.

The cooker in the preferred embodiment of this invention is made in the form of a small rectangular and substantially square receptacle or box 1, which is preferably formed of wood, the same having an imperforate bottom 2, sides 3, back 4, front 5, and hinged lid or cover 6. The front is provided with a hinged door 7, provided with a suitable latch 8, whereby it may be held closed.

In carrying out the present invention the corners of the compartment or receptacle are divided off by the segmental partitions 9, which are of such shape as to give a cylindrical form to the inside of the cooker, as shown in Figs. 1 and 3, to agree with the shape of the dishes to be placed therein and hereinafter more particularly referred to. The spaces 10, left in the corners of the receptacle by the partitions 9, are filled with hay, straw, asbestos wool, or the like, which serve to insulate the said corners of the receptacle and prevent the transmission of heat and cold to the interior of the same.

Within the cylindrical central portion of the receptacle are arranged pads or cushions 11, 12, and 13, the bottom and top pads 11 and 13 being annular or cylindrical, as indicated in Figs. 1 and 2, while the intermediate pad or cushion 12 is segmental or cylindrical with the exception of the front portion thereof, which is left open to allow the dishes or cooking utensils to be inserted through the front door 7, as will hereinafter appear. Each of the cushions 11, 12, and 13 has an outer casing or cover of ticking, burlap, or other textile material and a filling of hay or straw or asbestos wool or the like, the said cushions being placed one upon the other, as shown in Fig. 2, the cushions 11 and 13 filling the space below and above the planes of the bottom and top of the front door 7, while the pad or cushion 12 is of substantially the same height as said door. Another pad or cushion 14 is arranged at the inner side of the door and is vertically elongated and composed of several sections, as shown in Figs. 2 and 4, the said sections being secured to a backing-strip 15, so that one or more of the sections may be folded outward to give access to the dishes contained in the cooker after the door 7 has been swung open.

In the use of the cooker the dishes containing the material which requires the greatest amount of cooking are placed in the bottom of the compartment and the dishes which require less cooking are placed in the upper portion of the compartment. Therefore by folding downward the upper section of the pad or cushion 14 the upper dish may be removed without interfering with the underlying dishes and without letting in cold air to arrest the cooking operation of the dishes which lie below the plane of the section or sections of the pad which have been folded outward for the purpose of removing the uppermost dish or dishes. The construction described also permits an easy examination of the dishes and the condition of the material therein.

The cushions or pads 11, 12, 13, and 14 are preferably made soft and yielding, so that they will bear yieldingly against the outer edges or peripheries of the dishes, which are round or circular, as shown in Fig. 2. In order to insure a firm and close pressure between the cushions and the dishes or vessels placed in the cooker, springs 16 may be placed behind the cushions or between said cushions and the partition-walls 9, so as to exert their tendency to press the cushions inward into close engagement with the outer edges or peripheries or rims of the dishes or vessels.

The material to be cooked is first placed upon a fire and allowed to boil from five to thirty minutes, according to the nature of the material, and then while still strongly boiling the material is transferred in the original dishes or vessels to the cooker as quickly as possible and the door immediately closed. There surrounded by the cushions or pads, which exclude the outside air and insulate the interior of the receptacle, the material is left for several hours or for a time usually double the time ordinarily required to cook the material to the desired point.

The cooker hereinabove described is compact and is rendered accessible by a door in the side thereof instead of in the top, as usual, and by reason of having doors both in the top and one side thereof the cooker is adapted to be easily and thoroughly ventilated, aired, and cleansed.

I claim—

1. A cooker embodying an outer substantially square or rectangular receptacle, an inner cylindrical wall, annular pads or cushions mounted within the cylindrical wall, a door covering a doorway extending through one side of the receptacle and through the cylindrical wall thereof, and a folding pad or cushion arranged at the inner side of said door and the body of the receptacle, substantially as described.

2. A cooker embodying an outer receptacle, an inner cylindrical wall, annular pads or cushions mounted within the cylindrical wall, a door covering a doorway through one side of the outer receptacle and through the cylindrical wall thereof, and a folding and sectional pad or cushion arranged at the inside of the door, the sections of said pad being adapted to be folded outward one at a time independently of each other and give access to the inner compartment of the receptacle, substantially as described.

In testimony whereof I affix my signature in presence of two witnesses.

AUGUST K. SCHULTE.

Witnesses:
AUGUSTINE C. METZINGER,
FRANK A. METZINGER.